April 8, 1969 J. V. DEREGNAUCOURT 3,437,996
ERROR CORRECTING CIRCUIT
Filed April 30, 1965
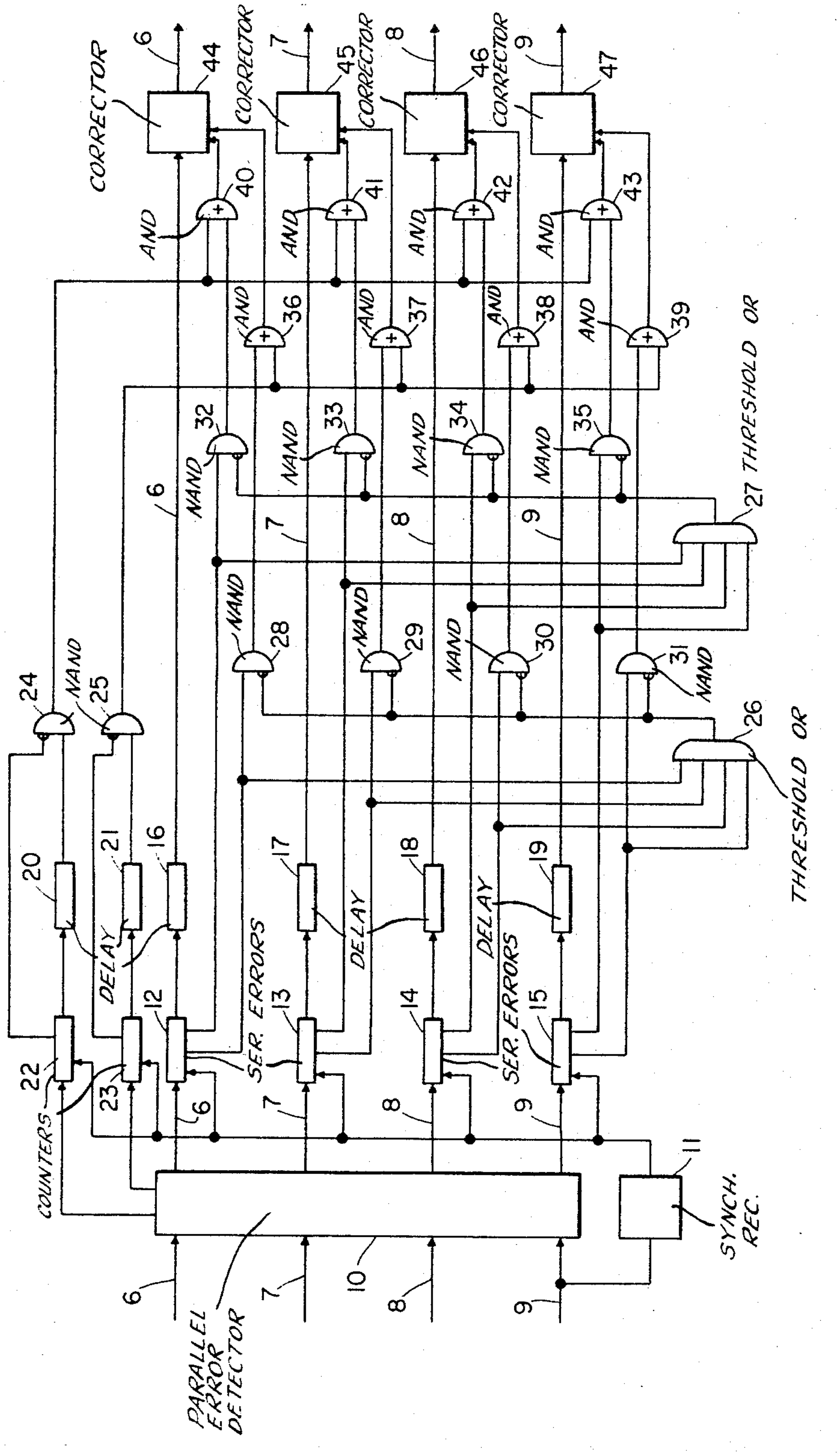

3,437,996
Patented Apr. 8, 1969

3,437,996

ERROR CORRECTING CIRCUIT

Jacques V. Deregnaucourt, Ottawa, Ontario, Canada, assignor to Northern Electric Company Limited, Montreal, Quebec, Canada Filed Apr. 30, 1965, Ser. No. 452,177
Int. Cl. G08b *29/00, 25/00;* H04j *3/02*
U.S. Cl. 340—146.1 6 Claims

ABSTRACT OF THE DISCLOSURE

An error correcting circuit for a digital data link particularly for use on PCM telephone lines, utilizing a serial parity check and a parallel parity check and including a delay means for delaying the data by one frame and error correcting means for correcting an error on a line of the data link designated by a serial parity error and at the time designated by a parallel parity error. The application of the invention to the T1 type of PCM telephone system is disclosed.

The present invention relates to an error correcting circuit for use with a plurality of digital data transmission channels for detecting and correcting errors in data transmission, which errors arise during the course of transmitting the data along a data link.

The present invention is particularly concerned with the transmission of data along a plurality of lines used for simultaneously transmitting data between two points, and involves an error correcting circuit which utilizes both serial and parallel error detectors for determining the location of errors in the transmitted data and for correcting such errors. The principle of the invention is that two error detecting codes are used, one in serial mode for each line of the data transmission link, the other in parallel mode. The serial code detects the failure line, the parallel code detects the time of the failure. A delay is provided at the receiving end of the data link, which delay is equal to the time required to receive a code word and provides sufficient time for the detection and correction of correctable errors. One essential feature of any system with which the error corrector of the present invention is to be used is that the bit rate must be the same in all involved lines, preferably also the serial error codes on each line should be transmitted simultaneously, with the error code being transmitted at the end of each block or "word" of information.

In order more clearly to illustrate the present invention, its application to a telephone carrier system using pulse code modulation will be illustrated. This system is known as the T1 PCM system. The T1 system is provided with a terminal at each end and 25 repeatered lines between the two terminals, with 24 lines actually used for data transmission, the twenty-fifth line being used for a parallel parity check. In the T1 carrier system the pulse repetition rate on each line is 1.544 megacycles per second. If this were increased to 1.600 megacycles per second, then two hundred digits per frame time would be available instead of 193. These seven extra digits could then be used for redundancy and parity checking purposes.

Error rates better than $10^{-6}$ are often required in these systems and at the same time it is not easy to use error correcting codes because of the very large number of digits per word required.

In order to achieve proper operation of the apparatus of the present invention as applied to the T1 system, it is necessary to synchronize the transmitting clocks for each encoder so that pulses are transmitted on the repeatered lines simultaneously. Additionally it is necessary to equalize the delay of the 25 repeatered lines so that the 25 synchronous digits in the 25 lines appear at the receiving end as a word transmitted in parallel form. The twenty-fifth digit of this word corresponding to the twenty-fifth line, is the parity check digit of the word, which may be used for determining the time of an error. Thus at the receiving end of the link, and in all repeaters, the signal incoming is 25 parallel inputs with a parity check, each input line having a 200 bit serial word with 7 redundancy digits. If only one of these redundancy digits is used for a parity check in serial mode, then a correcting device may be provided which will operate to correct errors in the transmitted signal where these errors are of a particular character. With this form of error corrector, any single error is corrected and all multiple errors are not corrected. With seven redundancy digits we can divide the 200 digits of each word into seven groups and correct any single error in each group.

The drawing of this application illustrates schematically an error correcting receiver terminal of a T1 link embodying the principles of the present invention. As shown in the figure this system is provided with four input lines and is adapted to detect two types of errors that is, errors in the positive or negative streams of pulses on the T1 link. In the operation of the equipment it is assumed that the framing of the four input lines is coherent.

The four input lines 6, 7, 8 and 9 are fed into the parallel error detector 10 and at the same time the input from line 9 is fed to the synchronization receiver 11 which generates framing pulses for the purpose of timing the operation of the apparatus. The inputs on the lines 6, 7, 8 and 9 are then checked in the parallel error detector 10 and are passed to the serial error detectors 12, 13, 14 and 15. Since the input data on lines 6, 7, 8 and 9 is in the form of simple binary digits, of two polarities then conventional and well known apparatus may be used for the parallel error detector 10 and the serial error detectors 12, 13, 14 and 15. After processing in the serial error detectors 12, 13, 14 and 15, the signal on the lines 6, 7, 8 and 9 is then delayed by one frame length in the delay lines 16, 17, 18 and 19. Similarly the information from the parallel detector 10 is delayed in the delay lines 20 and 21.

In the *parallel* error detector the word length is determined by the number of inputs. One complete word is transmitted during each time slot and, therefore one error may be detected during each time slot. At the maximum the parallel detector 10 can detect as many errors as there are digits in a *serial* word.

The counters 22 and 23 are provided for counting the number of digits detected by the parallel error detector 10, and the output of the counters 22 and 23 operate to close the NAND gates 24 and 25 when more than one error of the same type is detected between two syncronizing digits. Thus, only one error of each polarity is correctable during each frame.

THRESHOLD OR gates 26 and 27 are provided which close the NAND gates 28 to 35 inclusive when two or more serial errors of the same type are detected at the same time. The THRESHOLD OR gates 26 and 27 are arranged to give an output when more than one input is received. Two or more errors of the same type on the same line may be corrected by splitting the word into parts and providing a parity check digit for each part.

Finally AND gates 36 to 43 inclusive are provided which activate the correctors 44, 45, 46 and 47 when an error is shown on a line at a given time.

The input on lines 6, 7, 8 and 9 is a bi-polar binary PCM signal and the parallel error detector 10 is used to detect positive and negative pulses, both of which are parity checked. The serial error detectors 12, 13, 14 and 15 similarly are used to do positive and negative pulse serial parity checks and for this purpose a counter of two may be used.

A counter-of-two stores the number of pulses modulo two, in other words, it stores the parity index. Further the correctors 44, 45, 46 and 47 may be formed of two half adders, one being used for positive pulses and the other for negative pulses.

The truth table of a half adder is:

| A/B | 0 | 1 |
|---|---|---|
| 0 | 0 | 1 |
| 1 | 1 | 0 |

which is also the required truth table of the error corrector.

The error correcting circuit of the present invention may also be used with more sophisticated systems than the T1 multiplex system where codes such as a ternary code are used and the parallel parity check line signal consists of the sum of the digits of the ternary code modulo 3. Similarly for a ternary code the serial parity check may be replaced by the sum of the digits in a frame modulo 3. This serial parity check would require only one digit of the ternary code. In either case the principle of the invention is the same, two error detecting codes are used, one in serial mode and the other in parallel mode. The serial code detects the error line and the parallel code detects the time of the error. At the receiving end the signals on all lines are delayed for a time equal to the time required to transmit one code word in serial mode, and a corrector is provided which restores the correct code when a single error occurs.

This invention provides an error correcting device which operates on a link consisting of many one way digital transmission lines. These lines may be physically distinct or multiplexed in one physical transmission medium such as a coaxial cable or a radio link. In both cases the bit rate must be the same in all involved lines.

At the error correcting location the transmission lines may be physically separated and their delays equalized so that a parallel code word is generated by the digits received at the same time from the different lines. The digits transmitted into each line are arranged in frames of a given number of digits. Each frame is terminated by a synchronization digit, and is regarded as a code word. The code words must be chosen out of a single error detecting code. The parallel code words are fed into an error detecting device and if an error occurs, a signal is sent which describes the type of error according to the code capability. This signal is delayed (by a delay line or a shift register or any other device) by the time necessary to transmit a full frame.

The serial code words are checked in an error detecting device at the end of each frame. If an error occurred its description is stored in a memory. If no error is detected, the memory is cleared. Then the code words are delayed by a full frame transmission time and transmitted to a digital processor or error corrector.

Two coincident errors may not be corrected. Two cases have to be considered.

*1st case*.—The frames are coherent, that is the code words on the different lines begin and finish at the same time. Then we consider two error events coincident if they happen between the synchronizing digits of two successive words.

*2nd case*.—The frames are not coherent. The code words of each line are independent of the code words of all the others. Then we consider two error events coincident when they are distant not more than a full frame transmission time. (In this case the number of digits per frame may differ from one line to another. We must consider the largest number for coincidence purposes.)

The first case is preferable when possible because it will require less apparatus and will enable more error corrections.

To detect coincident errors a counter is connected at the output of the parallel error detector. In the first case the counter is reset after each synchronizing digit. In the second case it counts up the input pulses of the delaying device and down the output pulses. The multiple error counters inhibit the corresponding error corrector when the number stored in the counter is higher than one.

When an error event happens on a line, it reaches the corrector at the same time as the signal from the parallel error detector. If there is a record of such an error in the memory, the corrector performs the required logic operation.

There may not be a record of the same type of error in two memories when no coincident error has been detected. If it happens or if there is no record at all of this type of error, it means that 2 errors have occurred either on the same line or at the same time. Thus it is not possible to correct them and the corrector is inhibited.

In accordance with a further feature of the present invention, it is not necessary that the indication of errors be obtained in the same way by the serial and parallel detectors. Further it is not necessary that the code be the same on all lines provided they are synchronized. In a case where the code is not the same on all lines, a full indication of errors is obtained through a logical operation with the serial and parallel data. That is, as previously stated, the line on which an error occurs is located by a serial parity check on the line and the time at which an error occurs is located by a parallel parity check.

For example, assume the signal transmitted on a line is bi-polar ternary, that is the signal may take any value from the possible values of $-2$, $-1$, $0$, $+1$, $+2$ on lines 1 to $n-2$ and the redundancy digits are straight binary on lines $n-1$ and $n$. The signal on line $n-1$ is the sum modulo 2 of the positive digits and the signal on line $n$ is the sum modulo 2 of the negative digits of the signals which are transmitted in bi-polar ternary on the $n-2$ lines. The serial redundancy digit at the end of each frame on each line is the sum modulo 3 of both positive and negative digits on the lines 1 to $n-2$ and on lines $n-1$ and $n$ the redundancy digits are simple parity digits. With this arrangement of signals on the data lines, two types of parallel errors may be detected, plus and minus, and two types of serial errors may be detected on lines 1 to $n-2$, $+1$ and $+2$; and only one type of error may be detected on lines $n-1$ and $n$, the error $+1$.

The error correction circuit will then have to perform the following digital functions:

(1) Inhibit two or more errors of the same type both in serial and parallel form, (2) Correct as follows in each line.

| n−1 | n | 1 to n−2 | | Parallel | | Action |
|---|---|---|---|---|---|---|
| +1 Serial | +1 | +1 | +2 | + | − | |
| No | No | No | No | No | No | No action. |
| No | No | Yes | No | No | No | |
| No | No | No | Yes | No | No | |
| No | No | Yes | No | Yes | No | Add 1 to positive pulses. |
| No | No | No | Yes | Yes | No | Add 2 to positive pulses. |
| No | No | Yes | No | No | Yes | Add 1 to negative pulses. |
| No | No | No | Yes | No | Yes | Add 2 to negative pulses. |
| No | No | Anything | | Yes | Yes | No action. |
| Yes | Anything | | | Yes | Anything | Add 1 to line n−. |
| Yes | Yes | | | Yes | Yes | Add 1 to both n and n-1 lines. |
| Anything | Yes | | | Anything | Yes | Add 1 to line n. |
| No | No | | | Anything | | |
| Anything | | | | No | No | No action. |

In most cases the system of the present invention will be used with a straight binary or bipolar binary code but it is important to appreciate that this system may also be used with more complex codes and where a $n$-ary code is used then by grouping $n$ binary digits in one $(2^n)$ ary digit is possible to correct sets of $n$ errors in the same line.

I claim:

1. An error correcting circuit for a digital data link wherein digital data is transmitted on a plurality of lines, said data being arranged in frames, each of said frames being synchronized with the other frames on the other lines of the data link, one line of said data link being provided to carry a parallel parity check, each frame on each line also including at least one serial parity check digit at the end of each frame, said error correcting circuit comprising a parallel error detector to which the data on each of said lines is applied simultaneously, a serial error detector for each line of said data link, a delay line for each line of said data link, the delay of said delay line being the time required to transmit one complete frame of information on a line, a delay line for delaying outputs from the parallel error detector for one frame length, and means actuated by said parallel error detector and a serial error detector for correcting an error on one of said lines.

2. Apparatus according to claim 1 including means to inhibit the correction of errors when errors appear simultaneously on more than one line of said data link.

3. Apparatus according to claim 2 wherein said means for inhibiting the correction of errors comprises a THRESHOLD OR gate adapted to give an output when more than two inputs are received simultaneously, the input to said THRESHOLD OR gate being the outputs from said serial error detectors, the output from each of said THRESHOLD OR gates being fed to a NAND gate for each line of said data link, the other input for each of said NAND circuits being the output of the associated serial error detector, the output of each NAND gate being the input to an AND gate, the other input to each AND gate being the delayed output of the parallel error detector whereby the output of each AND gate is a signal adapted to energize the error corrector associated with each line of the data link.

4. Apparatus according to claim 1 wherein said error corrector comprises a half adder.

5. Apparatus according to claim 1 wherein said parallel error detector and said serial error detectors detect positive errors and negative errors and wherein said error correctors comprise a pair of half adders, one for positive errors and the other for negative errors.

6. An error correcting system for a digital data link on which digital data is transmitted bi-polar binary on a plurality of lines, said data being arranged in frames, each of said frames being synchronized with the other frames on the other lines of said data link, one line of said data link being provided to carry a positive and a negative parallel parity check, each frame on each line also including at least one serial positive and one serial negative parity check digit at the end of each frame, said error correcting circuit comprising a parallel error detector to which the data on each of said lines is applied simultaneously, said parallel error detector giving an output when either a positive or negative parallel error is detected, a serial error detector for each line of said data link, each serial error detector providing an output for either a positive or a negative serial error, a delay line for each line of said data link, the delay of said delay lines being the time required to transmit one complete frame of information on a line, a delay line for delaying outputs from the parallel error detector for one frame length, means for correcting an error on each of said lines actuated by said parallel error detector and a serial error detector, means to inhibit the correction of errors when errors appear simultaneously on more than one line of said data link, means to inhibit the correction of errors when parallel errors appear more than once in a frame of data, said means for correcting errors comprising a pair of half-adders one for positive errors and the other for negative errors.

References Cited

UNITED STATES PATENTS

| | | | |
|---|---|---|---|
| 2,977,047 | 3/1961 | Bloch | 235—153 |
| 3,183,483 | 5/1965 | Lisowski | 340—146.1 |
| 3,243,774 | 3/1966 | Betz | 340—146.1 |

MALCOLM A. MORRISON, *Primary Examiner.*

C. E. ATKINSON, *Assistant Examiner.*

U.S. Cl. X.R.

179—15